(12) United States Patent
Johnson et al.

(10) Patent No.: US 6,563,598 B1
(45) Date of Patent: May 13, 2003

(54) METHOD AND APPARATUS FOR DIGITAL DOCUMENT CONTROL

(75) Inventors: Steven M. Johnson, Eagle, ID (US); Bruce L. Johnson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/392,613

(22) Filed: Sep. 7, 1999

(51) Int. Cl.$^7$ .............................................. G06K 15/00
(52) U.S. Cl. ....................... 358/1.15; 358/1.1
(58) Field of Search ......................... 358/1.1, 1.6, 1.13, 358/1.15, 1.18, 462; 707/515, 516, 522, 524, 530; 382/181, 183; 345/629, 636; 399/144, 81, 82

(56) References Cited

U.S. PATENT DOCUMENTS

| | | | |
|---|---|---|---|
| 4,609,283 A | 9/1986 | Murata et al. ............. 355/14 R |
| 4,757,348 A | 7/1988 | Rourke et al. ................. 355/6 |
| 4,987,447 A | 1/1991 | Ojha .......................... 355/204 |
| 5,051,779 A | 9/1991 | Hikawa ...................... 355/200 |
| 5,161,037 A | * 11/1992 | Saito .......................... 358/468 |
| 5,207,412 A | 5/1993 | Coons, Jr. et al. ........... 270/1.1 |
| 5,243,381 A | 9/1993 | Hube |
| 5,438,659 A | 8/1995 | Notess et al. ............... 395/155 |
| 5,521,674 A | 5/1996 | Guillory et al. ............. 355/200 |
| 5,557,707 A | 9/1996 | Inoue et al. ................. 395/106 |
| 5,608,493 A | 3/1997 | Tanaka et al. ................ 399/83 |
| 5,710,874 A | 1/1998 | Bergen ....................... 395/115 |
| 5,729,350 A | 3/1998 | Ozaki ......................... 358/296 |
| 5,760,382 A | 6/1998 | Li et al. ..................... 235/436 |
| 5,867,633 A | 2/1999 | Taylor, III et al. .......... 395/109 |
| 5,887,088 A | 3/1999 | Kurokawa et al. .......... 382/317 |
| 5,893,124 A | 4/1999 | Ogaki et al. ................. 707/507 |
| 5,896,206 A | 4/1999 | Kellogg ....................... 358/498 |
| 5,905,249 A | 5/1999 | Reddersen et al. ..... 235/462.15 |

* cited by examiner

Primary Examiner—Arthur G. Evans

(57) ABSTRACT

A multi-function printer device is configured for use with job control sheets having machine readable indicia thereon, the multi-function printer device including a housing; an imaging area supported by the housing; a scanner supported by the housing to selectively scan at the imaging area; a print engine supported by the same housing; a control keypad supported by the housing; computer network interface hardware supported by the housing and adapted to be coupled to a computer network; and a controller coupled to the scanner, print engine, control keypad and computer network interface hardware and configured to control the print engine, and the scanner to provide a plurality of predefined printing, scanning, and copying functions, the functions including a function to receive a digital document from the computer network via the network interface hardware and to print one or more copies, a number of the functions being selectable from the computer network, but only a subset of the number of functions being selectable using the control keypad, the controller being configured to recognize when a job control sheet is scanned at the imaging area and to perform one of the functions in response to the machine readable indicia, wherein any of the number of functions selectable from the computer network can also be specified using a job control sheet. A method of manufacturing a multi-function printer device includes configuring a controller to recognize when a job control sheet is scanned at the imaging area and to perform one of a number of functions in response to the machine readable indicia, wherein any of the number of functions selectable from a computer network can also be specified using a job control sheet.

20 Claims, 6 Drawing Sheets

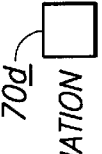
FIG. 4

NUMBER OF COPIES
1☐ 2☐ 3☐ 4☐ 5☐ 6☐ 7☐ 8☐ 9☐
*71a* *71b* *71c* *71d* *71e* *71f* *71g* *71h* *71i*
1☐ 2☐ 3☐ 4☐ 5☑ 6☐ 7☐ 8☐ 9☐ —68
*71j* *71k* *71l* *71m* *71n* *71o* *71p* *71q* *71r*
NUMBER OF STAPLES
68
1☑ 2☐ 2☐ 6☐
*71s* *71t* *71u* *71v*
COVERS
FRONT ☑  REAR ☑
  *71w*    *71x*
PAPER:
LEDGER ☐  LETTER ☑  LEGAL ☐  TRANSPARENCIES ☐
          *71y*       *71z*     *72a*
SAVE A COPY TO THE DOCUMENT ARCHIVE? ☑ —72b
                                         *72c*
BILLING DEPARTMENT:
5000 (R&D) ☐ —72d
4000 (MANUFACTURING) ☑ —72e
2000 (FINANCE) ☐ —72f
1000 (CORPORATE) ☐ —72g
9999 (PERSONAL) ☐ —72h

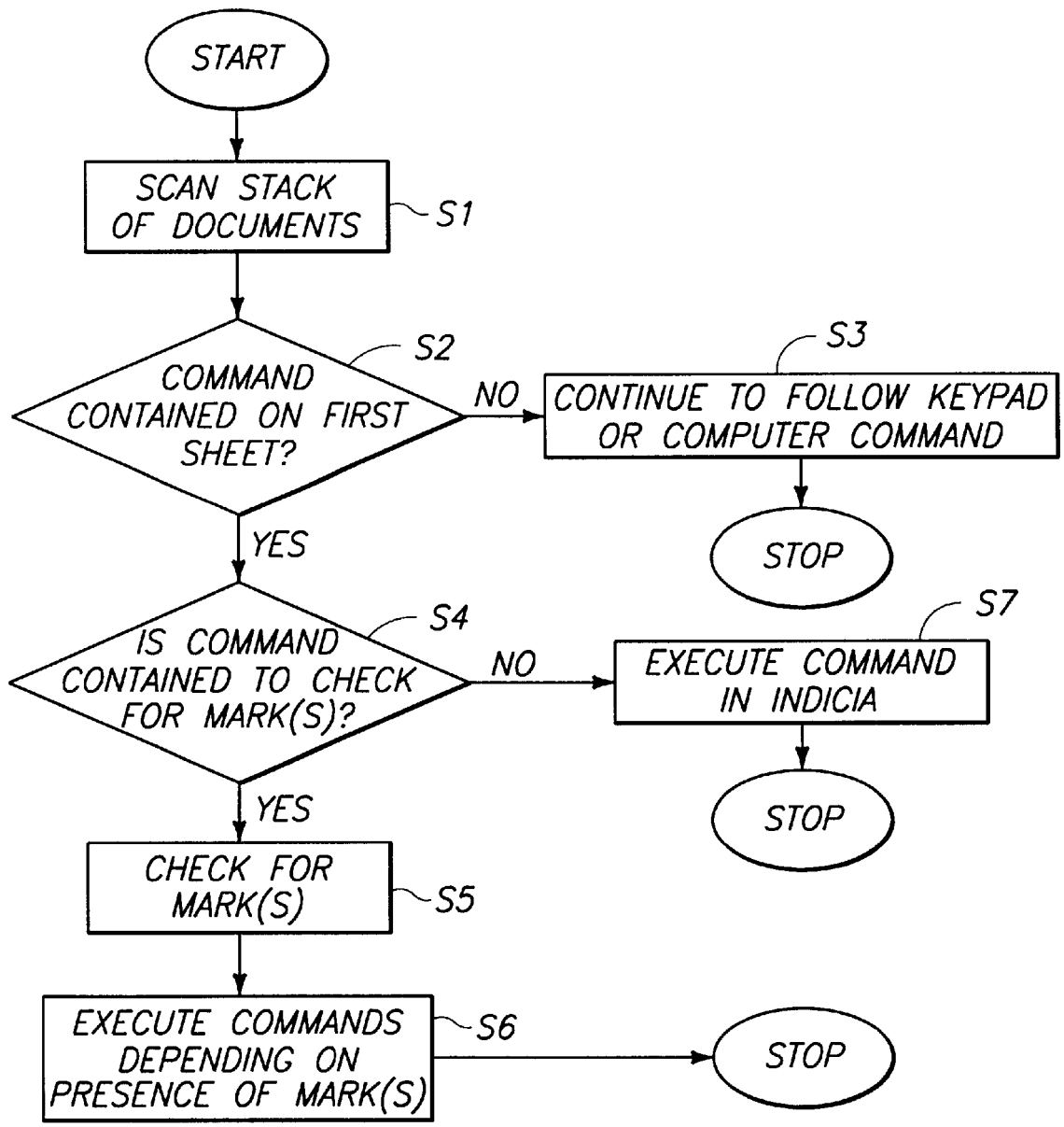

METHOD AND APPARATUS FOR DIGITAL DOCUMENT CONTROL

FIELD OF THE INVENTION

The invention relates to multi-function printers. More particularly, the invention relates to document control of multi-function printers.

BACKGROUND OF THE INVENTION

Multi-function printers are known in the art. These devices combine a printer and a scanner in a single housing. The printer is typically an inkjet printer, though some such multi-function devices include a laser printer. They thus take up less desktop space than separate printers and scanners, so are popular for home use or low volume office use. Because of the desirability of minimizing the size of such devices, only a minimal number of basic functions can be accessed using a control panel on the device itself. A large number of functions can only be accessed using a computer that is coupled to the device. Further, it may be desirable to omit the control panel altogether. U.S. Pat. No. 5,896,206 to Kellogg (incorporated herein by reference) discloses a multi-function printer.

Devices falling into this category also include, for example, the OfficeJet series (e.g. OfficeJet 500, 600, 630, 700, etc.) sold by Hewlett-Packard Company. Such devices include a small LCD display and a keypad with which phone numbers can be entered for sending faxes, and with which copies can be made, without need for the device to be coupled with and controlled by a computer. Other functions that can be performed using the keypad can include, for example, power on/off, auto answer on/off (to receive incoming faxes), speed dial, redial/pause, and contrast/resolution adjust. On the other hand, a rich assortment of additional features can be accessed and controlled by an attached computer. Using a graphical user interface on the attached computer, a user can, for example, select fax numbers from an address book, set up a fax for future transmission, reduce/enlarge, turn collating on or off, adjust contrast, adjust print quality, select when an image is scanned in color or black and white, select optimization for scanning of text, photos, graphics, or other, select printing landscape or portrait, select whether to include a cover page in a fax, select whether received faxes are directed to the printer or to the computer, select whether faxes are reduced automatically to loaded paper size, adjust resolution, select number of rings before answering an incoming phone call, forward a fax, add/change/delete speed dial codes, enter time/date (this can also be performed using the keypad), print a self-test report, clean a print cartridge, align a print cartridge, test communications, etc.

Another device falling in this category is the Mopier 320, available from Hewlett-Packard Company.

Methods for encoding data on a page are known in the art. See, for example, the following U.S. patents.

U.S. Pat. No. 5,893,124 to Ogaki et al. (incorporated herein by reference) discloses a method for preparing an instruction sheet, having a predetermined format, for executing an instruction included on the instruction sheet.

U.S. Pat. No. 5,207,412 to Coons, Jr. et al (incorporated herein by reference) discloses a multi-function document integrator having control indicia on sheets. Machine readable indicia is printed on at least some sheets to control a feeding operation performed by the document integrating device.

U.S. Pat. No. 5,051,779 to Hikawa (incorporated herein by reference) discloses a job control sheet for an image processing system. Selected image processing is executed in accordance with the existence of a special mark or pattern. The job control sheet has sheet detection marks 101a–101d indicating sheet attributes.

U.S. Pat. No. 4,987,447 to Ojha (incorporated herein by reference) discloses a reproduction apparatus having a scanner, and which produces a control sheet so that future production runs with the same setup configuration can be produced with minimum operator intervention by scanning control sheets and converting indicia thereon to setup information.

U.S. Pat. No. 4,609,283 to Murata et al. (incorporated herein by reference) discloses a copying apparatus with preprogrammed features enabled by a document. The copying apparatus has a control panel that can be enabled for programming of copying functions while displaying them to the user. The user can then store the program in correlation with a specific code indicia. The coded indicia can then be placed on a document and inserted into a copying machine with the code indicia sensed. Upon sensing the code indicia, the prestored copier function program is enabled.

U.S. Pat. No. 4,575,348 to Rourke et al. (incorporated herein by reference) discloses an electronic reprographic/printing machine with a scanning array. Operation of the machine is controlled in response to control instructions. A control sheet has at least one coded image which when scanned as a document provides control instructions for operating the machine to carry out a preset cycle. The control sheet is associated with the documents to be scanned so that the control sheet is scanned with the documents.

A problem with all of these methods is that a special program on customized apparatus is required on the device. The job control pages are not useful on another device unless the other device has the same program.

SUMMARY OF THE INVENTION

The invention provides a method and apparatus wherein a job control sheet includes both program instructions and data required to perform an operation on a device including a printer and scanner in a common housing.

In one aspect of the invention, any function that can be performed by the device can be accessed by the sheet. In a more particular aspect of the invention, the sheet includes machine readable program code. In another aspect of the invention, the sheet accesses a program interface of the device.

In another aspect of the invention, the machine readable program code includes an instruction to check a predetermined location of the sheet for a marking, and, if the marking is present, a predetermined function is performed.

One aspect of the invention provides a multi-function printer device configured for use with job control sheets having machine readable indicia thereon, the multi-function printer device comprising a housing; an imaging area supported by the housing; a scanner supported by the housing to selectively scan at the imaging area; a print engine supported by the same housing; a control keypad supported by the housing; computer network interface hardware supported by the housing and adapted to be coupled to a computer network; and a controller coupled to the scanner, print engine, control keypad and computer network interface hardware and configured to control the print engine, and the scanner to provide a plurality of predefined printing, scanning, and copying functions, the functions including a function to receive a digital document from the computer network via the network interface hardware and to print or more copies, a number of the functions being selectable from the computer network, but only a subset of the number of functions being selectable using the control keypad, the controller being configured to recognize when a job control sheet is scanned at the imaging area and to perform one of the functions in response to the machine readable indicia, wherein any of the number of functions selectable from the computer network can also be specified using a job control sheet.

Another aspect of the invention provides a method of manufacturing a multi-function printer device for use with a job control sheet having machine readable indicia thereon, the method comprising providing a multi-function printer device including a housing, an imaging area supported by the housing, a scanner supported by the housing and configured to selectively scan at the imaging area, a print engine supported by the same housing, a control keypad supported by the housing, computer network interface hardware supported by the housing and adapted to be coupled to a computer network, and a controller coupled to the scanner, print engine, control keypad and network interface hardware, the controller being configured to control the print engine, and the scanner to provide a plurality of predefined printing, scanning, and copying functions, the functions including a function to receive a digital document from the computer network via the network interface hardware and to print one or more copies, a number of the functions being selectable from the computer network, but only a subset of the number of functions being selectable using the control keypad; and configuring the controller to recognize when a job control sheet is scanned at the imaging area and to perform one of the functions in response to the machine readable indicia, wherein any of the number of functions selectable from the computer network can also be specified using a job control sheet.

Other features and advantages of the invention will become apparent to those of ordinary skill in the art upon review of the following detailed description, claims, and drawings.

DESCRIPTION OF THE DRAWINGS

FIG. 4 is a job control sheet in accordance with one alternative embodiment of the invention.

FIG. 5 is a job control sheet in accordance with another alternative embodiment of the invention.

FIG. 6 is a flowchart illustrating how a controller of the multi-function printer device is programmed, in one embodiment of the invention.

DETAILED DESCRIPTION OF THE INVENTION

Figure 1:
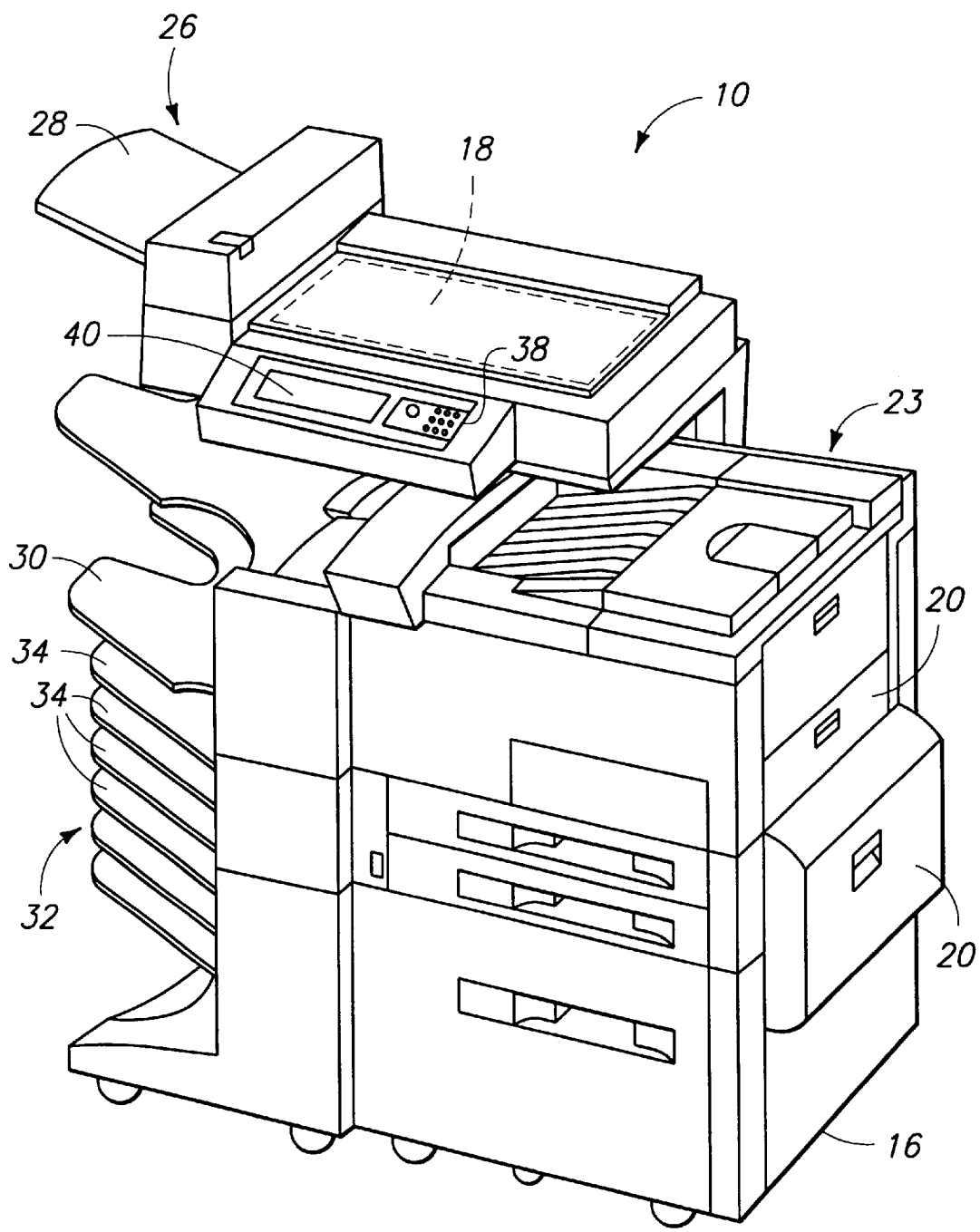
FIG. 1 is a perspective view of a multi-function printer device embodying the invention.
Figure 3:
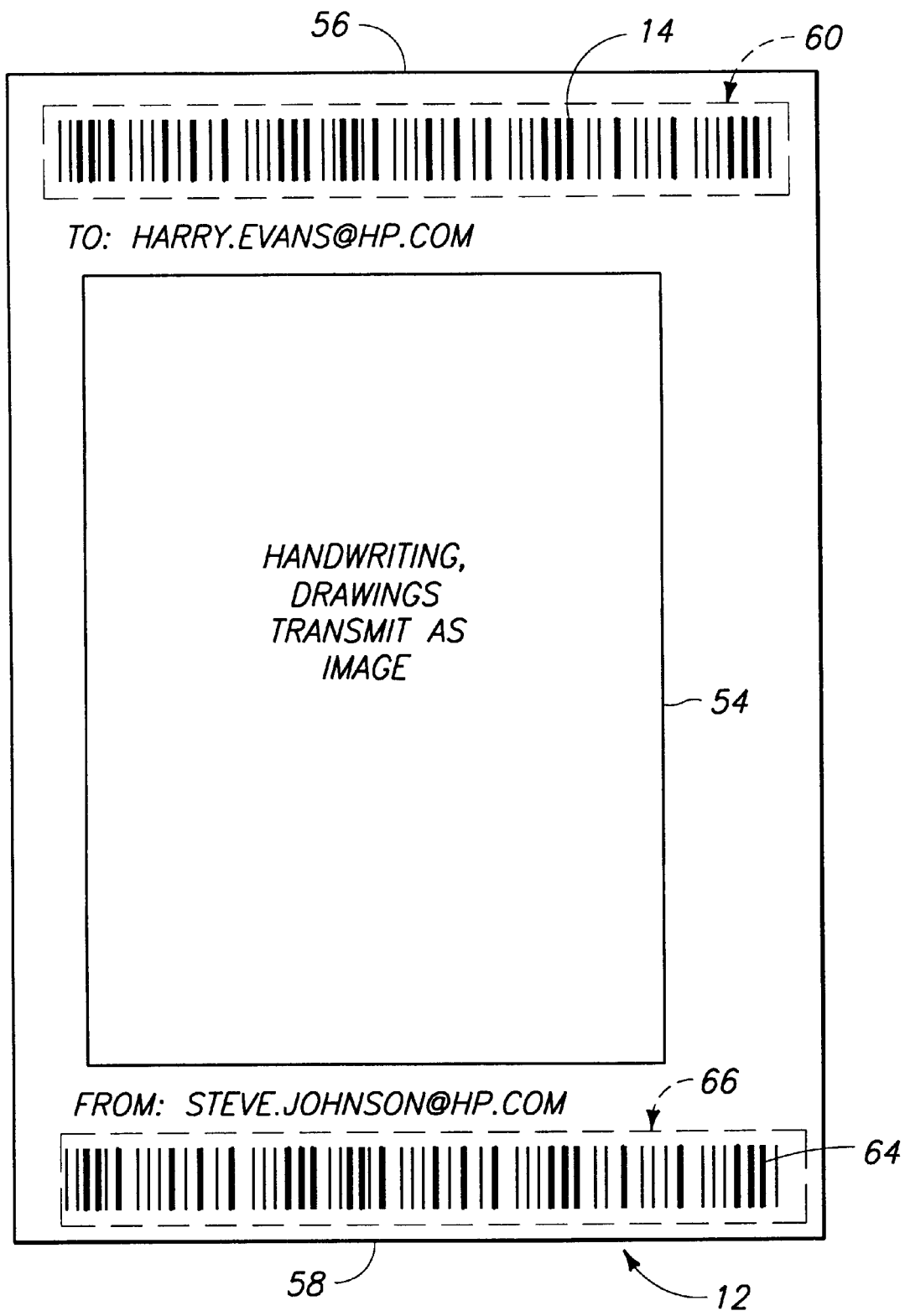
FIG. 3 is a job control sheet used with the multi-function printer device of FIG. 1.

FIG. 1 shows a multi-function printer device 10 in accordance with one aspect of the invention. The multi-function printer device 10 is configured for use with job control sheets 12 (FIG. 3) having machine readable indicia 14 thereon. In one embodiment, the multi-function printer device 10 is substantially similar to the HP Mopier 320, available from Hewlett Packard Company of Palo Alto, Calif., except that it is configured for use with job control sheets 12, as will be described in more detail below. The multi-function printer device comprises a housing 16 (FIG. 1). The multi-function printer device further comprises an imaging area 18, supported by the housing 16. The imaging area includes, for example, a horizontal, planar, sheet of glass or other transparent material. The multi-function printer device 10 further includes a plurality of sheet supply areas 20 supported by the housing 16, for supporting blank paper or other media of various standard sizes or user-defined sizes.

Figure 2:
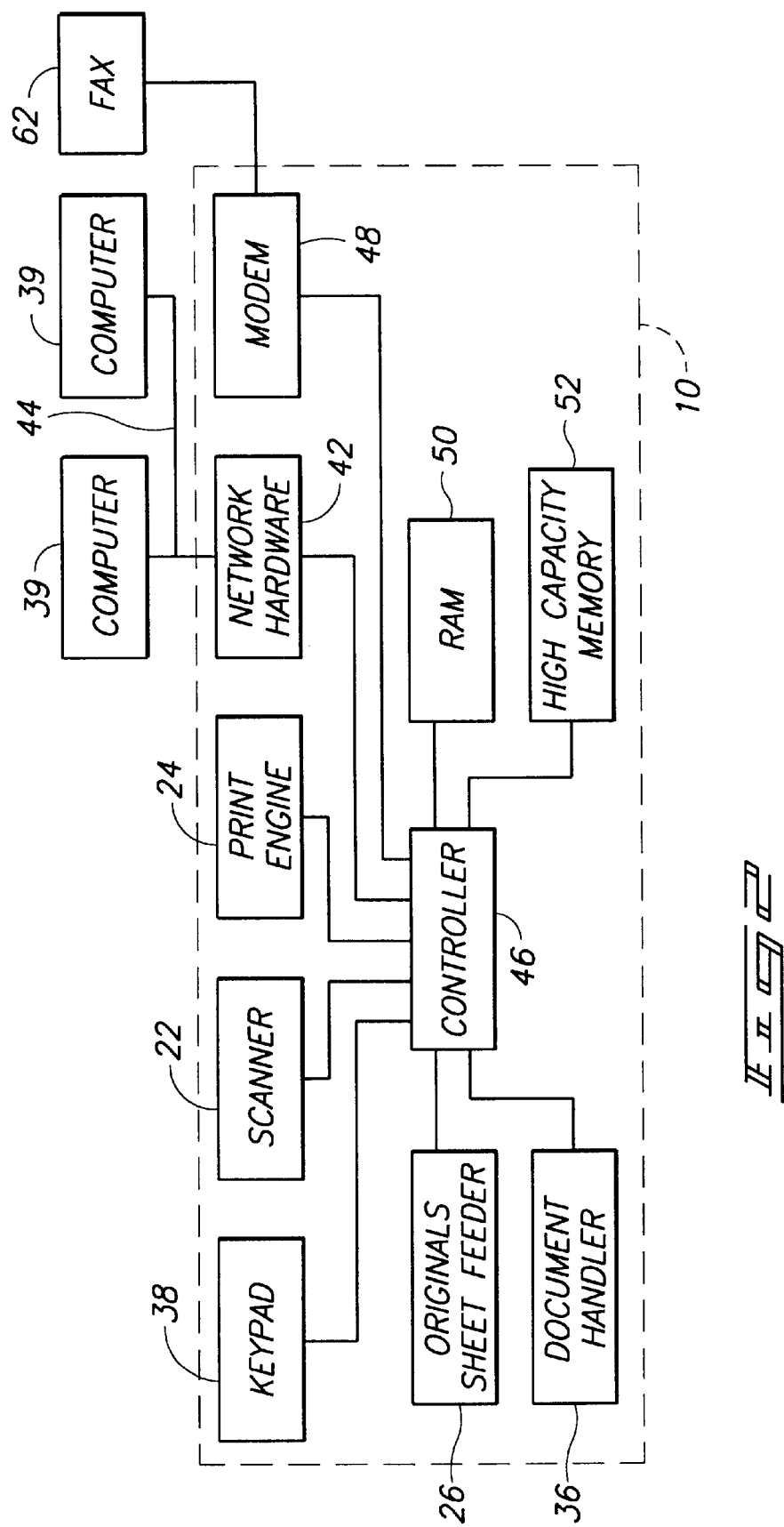
FIG. 2 is a block diagram of components of the multi-function printer device of FIG. 1.

The multi-function printer device 10 further includes a scanner 22 (FIG. 2) supported in the housing 16 to selectively scan the imaging area 18. In the illustrated embodiment, the scanner 22 includes dual scan heads to reduce the likelihood of paper jams. The scanner 22 may comprise, for example, a 3097SD Duplex Scanner available from Fujitsu Limited, or any other appropriate scanner.

The multi-function printer device 10 further includes a printer 23 including a print engine 24 (FIG. 2) supported in the housing 16. In the illustrated embodiment, the print engine 24 comprises a laser print head and toner assembly (not shown). In an alternative embodiment, the print engine comprises ink jets (not shown).

In one embodiment, the multi-function printer device 10 further includes an originals sheet feeder or document handling assembly 26 supported by the housing 16. In the illustrated embodiment, the originals sheet feeder 26 comprises a support 28, for supporting a stack of media, with adjustable guides (not shown), and a feeder configured to sequentially feed originals from the stack to the imaging area 18, and, after scanning by the scanner 22, return the scanned original to the stack, or transport the scanned original to a separate originals output tray (not shown).

The multi-function printer device 10 further includes a copy output tray 30 supported by the housing 16. In one embodiment, the multi-function printer device 10 includes a collator 32, for collating multiple copies, in which case the multi-function printer device includes multiple output trays 34 for receiving the respective collated copies. For example, the multiple output trays 34 can be movable relative to an output port (not shown) for collating the multiple copies. However, in the illustrated embodiment, collation is electronic as opposed to mechanical (e.g. pages of electronic documents can be printed in sequence, so entire documents in correct order are printed for each desired copy).

The multi-function printer device 10 further includes a document handler assembly 36 supported by the housing 16. The document handler assembly 36 is configured to transport a sheet from a sheet supply area 20 to the print engine 24 to an output tray 30 or 34.

The multi-function printer device 10 further includes a control keypad 38 supported by the housing 16. The control keypad 38 preferably includes number keys, for entering a fax number, and a start button. In one embodiment, the control keypad 38 can be used to effect making of copies or sending of faxes. In one embodiment, with the control keypad 38, copies can be made without need for the device to be coupled with and controlled by a computer 39 or computer network 44. In one embodiment, other functions that can be performed using the keypad 38 can include, for example, power on/off, auto answer on/off (to receive incoming faxes), speed dial, redial/pause, and contrast/resolution adjust. In the illustrated embodiment, the control keypad includes keys, such as a 10 key pad for entering fax numbers, and further includes a screen 40 for displaying and selecting functions (e.g., a touch screen), for providing menus, or for diagnostic information. In one embodiment, separate keypads and screens are provided for the scanner 22 and printer 23.

In one embodiment, the control keypad 38 is omitted altogether except for an on/off switch and, perhaps, a start button (or the start button is omitted and a sensor for detecting the presence of an original in the originals input tray is employed).

The multi-function printer device 10 further includes network interface hardware 42 supported by the housing and adapted to be coupled to the computer network 44 for bi-directional communications with one or more computers 39. In the illustrated embodiment, the network interface hardware 42 comprises a bidirectional IEEE 1284-compliant parallel interface. In the illustrated embodiment, the network interface hardware 42 may also include an HP JetDirect 600N (EIO) internal print server for autosensing fast ethernet 10/100Base-TX networks. The multi-function printer device 10 further includes, in one embodiment, one or more of HP JetDirect 600N (EIO) internal print servers for Ethernet 10Base-T and 10Base2, Token Ring and LocalTalk environments, and is HP JetSend-enabled via EIO. One embodiment further includes parallel and infrared (FIR) connections for device to device communications.

In one embodiment, the multi-function printer device 10 further includes software such as IPX/SPX protocol support for Novell Netware 3.11, 3.12, 4.x, and 5.0, Windows 95/98, networking Windows NT 3.51, 4, IBM OS/2 Warp 3.0 or 4.0, Artisoft LANtastic v7.0, and TCP/IP support for HP-UX 10.2, 11.x; SunOS v4.1.3, 4.1.4, Solaris v2.3, 2.4, 2.4.x, 2.6, IBM AIX v3.2.5 and later IBM OS/2 Warp v3.0, 4.0, Windows NT 3.51, 4.0, Windows 95/98 Networking, MPE-iX 5.5, Novell NetWare 5.0, and EtherTalk support for AppleTalk (System 7).

In one embodiment, the multi-function printer device 10 further is configured for PDLs such as HP PCL 6, HP PCL 5e and PostScript Level 2 emulation with automatic language switching between languages, I/O ports, and network protocols.

The multi-function printer device 10 further includes a controller 46 coupled to the scanner 22, print engine 24, control keypad 38 (if provided) and to the network interface hardware 42. In the illustrated embodiment, the controller 46 comprises a RISC processor. The controller 46 may comprise a single processor, or multiple integrated circuits, such as multiple processors (and/or ASICs) for the scanner 22 and print engine 24 which are coupled together (e.g., coupled to an additional processor). The multi-function printer device 10 further includes RAM 50 (e.g. standard RAM and slots for memory expansion, optional flash memory DIMMS) and high capacity memory 52 (e.g. EIO disk drive for copying and storage or forms) for carrying out the functions. The controller 46 is configured to control the print engine 24, the scanner 22, and the first and second document handling assemblies 26 and 36 to provide a plurality of predefined printing, scanning, and copying functions. The functions include, in one embodiment, all functions provided by the HP Mopier 320, available from Hewlett Packard Company of Palo Alto, Calif.

These functions include, for example, a quick copy function—while picking up print jobs recently sent to the multi-function printer device, users can make extra "original" copies (i.e. additional prints of an electronic document previously sent to the device) without having to go back to their computers.

Another function is a proof and hold function—users don't need to print an original, proof the document, then recopy the printed document. Instead, they can print the first copy, proof the document, and if satisfied produce the remaining copies directly from the multi-function printer device.

Another function is a stored job function—frequently used documents such as training manuals or forms can be stored, enabling users to walk up and print them on demand.

Another function is a private print function—users can maintain privacy and confidentiality of their documents on a shared device. End users can send and retrieve confidential documents by entering an assigned personal identification number at the multi-function device.

Additional functions include, in one embodiment, the ability to make from 1 to 999 copies; conversions between standard paper sizes as well as reduction/enlargement from 25 to 200 percent in 1 percent increments; input/output media selection including multiposition stapling; auto-configure to copier setup; specify output paper size/paper tray; sort and staple; job cancel; photo/text modes; background removal; 5 levels of brightness/contrast adjustment; copy modes (1-1, 1-2, 2-2, 2-1); job interrupt; N-Up layout (2 or 4 images/page); book copy; job binding from the copy platen; context-sensitive help; powersave mode; single pass duplex copying (two-sided copying is achieved with a single-pass through dual scan heads); and straight-through paper path.

In the illustrated embodiment, the functions include a function to receive a digital document from the computer network 44 via the network interface hardware 42 and to print one or more copies, a number of the functions being selectable from the computer network 44, but only a subset of the number of functions being selectable using the control keypad 38. The controller 46 is configured to recognize when a job control sheet 12 (FIG. 3) is scanned at the imaging area 18 and to perform a function in response to the machine readable indicia 14. Any of the number of functions selectable from the computer network can be specified using a job control sheet.

In one embodiment, the machine readable indicia 14 defines commands executable by the controller 46.

Various functions can be selected using the job control sheet 12. In one embodiment, the controller 46 is configured to electronically transmit a document to a predetermined address (such as an address on the network, or to an external address), the address being defined in the machine readable indicia. The multi-function printer device 10, in one embodiment, further includes a modem 48 supported in the housing 16, for transmitting a document to an external address. The transmitting can comprise faxing or e-mailing.

More particularly, in one embodiment, the controller 46 is configured to fax to a predetermined fax number (e.g., using the modem 48), the fax number being defined in the machine readable indicia. Information included in at least an area 54 transmits as a normal fax image to the recipient fax machine 62.

In one embodiment, the job control sheet 12 has first and second opposite edges 56 and 58, and the machine readable indicia 14 defines commands recognizable by the controller 46 if located in a predetermined area 60 of the job control sheet 12. In the illustrated embodiment, the predetermined area 60 is proximate the first edge 56 of the job control sheet. In one embodiment, the controller is further configured to electronically transmit the job control sheet 12 and a document scanned after the job control sheet was scanned (i.e., the stack placed in the originals sheet feeder 26) to a recipient (computer 39 or fax machine 62) at a predetermined address (e-mail address or fax number) in response to a command on a job control sheet 12 if located in the predetermined area 60. The address is defined in the machine readable indicia 14. In this embodiment, a return address can be defined in machine readable code 64 in a predetermined area 66 proximate the second edge 58 of the job control sheet 12 and used by the recipient to reply by merely rotating the received image of the job control sheet 180 degrees and using it with a like multi-function printer device.

The machine readable indicia 14 defines at least one of a plurality of possible commands to the controller. In alternative embodiments (see FIGS. 4 and 5), the controller 46 is further configured to recognize a command to check for a marking 68 in one of a plurality of predetermined areas 70a–d (FIG. 4) on the job control sheet 12. The controller 46 is further configured to transmit a document, including the job control sheet 12 and sheets scanned after the job control sheet is scanned, to a predetermined address and using a predetermined format, the address and format being defined by in which of the plurality of predetermined areas the marking exists. The address can be a fax number, e-mail address, location on the network 44, etc. The format can be a Jetsend format, fax (e.g. TIFF) format, image (e.g. GIF, JPEG) format, etc.

In one embodiment (see FIG. 5), the controller 46 is configured to recognize a command to check for markings 68 in predetermined areas 71a–z, 72a–h on the job control sheet 12. The markings 68 define data. The controller 46 is further configured to perform, or effect performance of, one of the functions of the device 10 using that data. The functions can be any of the functions that can be effected using a computer 39 coupled to the device 10. For example, the functions can be selection of number of copies, selection of number of staples, selection of covers (e.g. sheets from a specified sheet supply area 20), selection of paper size, indication of whether to save an electronic copy in a document archive in the high capacity storage 52, and indication of billing department.

FIG. 6 illustrates how the controller 46 is programmed, in accordance with one embodiment of the invention.

In step S1, documents in a stack from originals sheet feeder 26 are scanned. In the illustrated embodiment, scanning is initiated by pressing a predetermined button or touch screen area of the control keypad 38 or by sending a command from a computer 39. After performing step S1, the controller 46 proceeds to step S2.

In step S2, the controller determines whether a command is contained (e.g., in a predetermined area 60) on the first scanned sheet of the stack. If so, the controller proceeds to step S4. If not, the controller 46 proceeds to step S3.

In step S3, control proceeds normally based on, for example, commands selected by control keypad 38 or by a computer 39 which initiated the scanning.

In step S4, a determination is made as to whether a command exists in the indicia 14 to check for marks 68 in predetermined areas 70a–d, 71a–z or 72a–h. If so, the controller 46 proceeds to step S5. If not, the controller 46 proceeds to step S7.

In step S5, the controller checks for marks 68 in the predetermined areas 70a–d, 71a–z or 72a–h. After performing step S5, the controller 46 proceeds to step S6.

In step S6, the controller executes commands depending on where the marks 68 were made.

In step S7, where there was no command to check for marks 68, the command (e.g. to fax or e-mail) contained within the indicia 14 is executed.

In one alternative embodiment, instead of using machine readable indicia, OCR is used, e.g., on a predetermined area of the first sheet of any stack to be scanned, and a determination is made whether a command is present. In another alternative embodiment, machine readable indicia is on the back side of the job control sheet.

Thus, control of the multi-function printer device can be performed even when no control keypad exists. Any function that can be initiated by a computer can be initiated using the job control sheet, because the indicia 14 accesses the control program of the multi-function printer device.

The protection sought is not to be limited to the disclosed embodiments, which are given by way of example only, but instead is to be limited only by the scope of the appended claims.

What is claimed is:

1. A multi-function printer device configured for use with job control sheets having machine readable indicia thereon, the multi-function printer device comprising:

a housing;

an imaging area supported by the housing;

a scanner supported by the housing to selectively scan at the imaging area;

a print engine supported by the same housing;

a control keypad supported by the housing;

computer network interface hardware supported by the housing and adapted to be coupled to a computer network; and a controller coupled to the scanner, print engine, control keypad and computer network interface hardware and configured to control the print engine, and the scanner to provide a plurality of predefined printing, scanning, and copying functions, the functions including a function to receive a digital document from the computer network via the network interface hardware and to print one or more copies, a number of the functions being selectable from the computer network, but only a subset of the number of functions being selectable using the control keypad, the controller being configured to recognize when a job control sheet is scanned at the imaging area and to perform one of the functions in response to the machine readable indicia, wherein any of the number of functions selectable from the computer network can also be specified using a job control sheet.

2. A multi-function printer device in accordance with claim 1 wherein the controller is further configured to electronically transmit a document to a predetermined address, the address being defined in the machine readable indicia.

3. A multi-function printer-device in accordance with claim 1 wherein the controller is further configured to fax to a predetermined fax number, the fax number being defined in the machine readable indicia.

4. A multi-function printer device in accordance with claim 1 wherein the machine readable indicia defines at least one of a plurality of possible commands to the controller, wherein the controller is further configured to recognize a command to check for a marking in one of a plurality of predetermined areas on the job control sheet, and wherein the controller is further configured to fax a document, including the job control sheet and sheets scanned after the job control sheet is scanned, to a predetermined fax number, the fax number being defined by in which of the plurality of predetermined areas the marking exists.

5. A multi-function printer device in accordance with claim 1 wherein the machine readable indicia defines commands to the controller, and wherein the controller is further configured to recognize a command to check for a marking in one of a plurality of predetermined areas on the job control sheet, the marking defining data, and to perform one of the functions using that data.

6. A multi-function printer device in accordance with claim 5 wherein the controller is further configured to fax a document scanned after the job control sheet was scanned to a predetermined fax number in response to a marking being present in a first one of the predetermined areas on the job control sheet.

7. A multi-function printer device in accordance with claim 5 wherein the controller is further configured to e-mail an electronic copy of a document scanned after the job control sheet was scanned to a predetermined e-mail address in response to a marking being present in a second one of the predetermined areas on the job control sheet.

8. A multi-function printer device in accordance with claim 1 wherein the machine readable indicia defines commands recognizable by the controller, including a command to check for a marking in a predetermined area on the job control sheet, and wherein the controller is further configured to recognize a command to check for a marking in a predetermined area on the job control sheet, the marking defining data indicating that a predetermined number of copies is desired, and to effect copying of a document scanned after the job control sheet was scanned and to produce the desired number of copies.

9. A multi-function printer device in accordance with claim 1 wherein the job control sheet has first and second opposite edges, the machine readable indicia defines commands recognizable by the controller if located in a predetermined first area of the job control sheet proximate the first edge of the job control sheet, wherein the controller is further configured to electronically transmit the job control sheet and a document scanned after the job control sheet was scanned to a recipient at a predetermined address on the network in response to a command on a job control sheet if located in the predetermined area, the address being defined in the machine readable indicia, wherein a return address can be defined in machine readable code in a predetermined area proximate the second edge of the job control sheet and used by the recipient to reply by rotating the job control sheet 180 degrees and using it with a like multifunction printer device.

10. A method of manufacturing a multi-function printer device for use with a job control sheet having machine readable indicia thereon, the method comprising:
providing a multi-function printer device including a housing, an imaging area supported by the housing, a scanner supported by the housing and configured to selectively scan at the imaging area, a print engine supported by the same housing, a control keypad supported by the housing, computer network interface hardware supported by the housing and adapted to be coupled to a computer network, and a controller coupled to the scanner, print engine, control keypad and network interface hardware, the controller being configured to control the print engine, and the scanner to provide a plurality of predefined printing, scanning, and copying functions, the functions including a function to receive a digital document from the computer network via the network interface hardware and to print one or more copies, a number of the functions being selectable from the computer network, but only a subset of the number of functions being selectable using the control keypad; and
configuring the controller to recognize when a job control sheet is scanned at the imaging area and to perform one of the functions in response to the machine readable indicia, wherein any of the number of functions selectable from the computer network can also be specified using a job control sheet.

11. A method in accordance with claim 10 wherein the method further comprises configuring the controller to electronically transmit a document to a predetermined address, the address being defined in the machine readable indicia.

12. A method in accordance with claim 10 and further comprising configuring the controller to electronically transmit a document including the job control sheet and sheets scanned after the job control sheet is scanned, to a predetermined address on the network, the address being defined in the machine readable indicia.

13. A method in accordance with claim 10 wherein the machine readable indicia defines at least one of a plurality of possible commands to the controller, wherein the method further comprises configuring the controller to recognize a command to check for a marking in one of a plurality of predetermined areas on the job control sheet, and to fax a document, including the job control sheet and sheets scanned after the job control sheet is scanned, to a predetermined fax number, the fax number being defined by in which of the plurality of predetermined areas the marking exists.

14. A method in accordance with claim 10 wherein the machine readable indicia defines commands to the controller, and wherein the method further comprises configuring the controller to recognize a command to check for a marking in one of a plurality of predetermined areas on the job control sheet, the marking defining data, and to perform one of the functions using that data.

15. A method in accordance with claim 14 and further comprising configuring the controller to fax a document scanned after the job control sheet was scanned to a predetermined fax number in response to a marking being present in a first one of the predetermined areas on the job control sheet.

16. A method in accordance with claim 14 and further comprising configuring the controller to e-mail an electronic copy of a document scanned after the job control sheet was scanned to a predetermined e-mail address in response to a marking being present in a second one of the predetermined areas on the job control sheet.

17. A method in accordance with claim 14 wherein the machine readable indicia defines commands recognizable by the controller, including a command to check for a marking in a predetermined area on the job control sheet, the method further comprising configuring the controller to recognize a command to check for a marking in a predetermined area on the job control sheet, the marking defining data indicating that a predetermined number of copies is desired, and to effect copying of a document scanned after the job control sheet was scanned and to produce the desired number of copies.

18. A method in accordance with claim 10 wherein the machine readable indicia defines commands recognizable by the controller if located in a predetermined area of the job control sheet proximate a top edge of the job control sheet, the method further comprising configuring the controller to electronically transmit the job control sheet and a document scanned after the job control sheet was scanned to a recipient at a predetermined address on the network in response to a command on a job control sheet if located in the predetermined area, the address being defined in the machine readable indicia, wherein a return address can be defined in machine readable code in a predetermined area proximate the bottom edge of the job control sheet and used by the recipient to reply by rotating the job control sheet 180 degrees and using it with a like multi-function printer device.

19. A multi-function printer device configured for use with job control sheets having machine readable indicia thereon, the multi-function printer device comprising:

a housing;

an imaging area supported by the housing;

a sheet supply area supported by the housing;

a scanner supported in the housing to selectively scan the imaging area;

a print engine supported in the housing;

an originals sheet feeder supported by the housing;

a copies output tray supported by the housing;

a first document handler assembly configured to transport an original from the sheet feeder to the imaging area;

a second document handler assembly configured to transport a sheet from the sheet supply area to the print engine to the copies output tray;

a control keypad supported by the housing;

network interface hardware supported by the housing and adapted to be coupled to a computer network; and a controller coupled to the scanner, print engine, control keypad and to the network interface hardware and configured to control the print engine, the scanner, and the first and second document handling assemblies to provide a plurality of predefined printing, scanning, and copying functions, the functions including a function to receive a digital document from the computer network via the network interface hardware and to print one or more copies, a number of the functions being selectable from the computer network, but only a subset of the number of functions being selectable using the control keypad, the controller being configured to recognize when a job control sheet is scanned at the imaging area and to perform a function in response to the machine readable indicia, wherein any of the number of functions selectable from the computer network can be specified using a job control sheet.

20. A multi-function printer device in accordance with claim 19 wherein the job control sheet has first and second opposite edges, the machine readable indicia defines commands recognizable by the controller if located in a predetermined area of the job control sheet proximate the first edge of the job control sheet, wherein the controller is further configured to electronically transmit the job control sheet and a document scanned after the job control sheet was scanned to a recipient at a predetermined address on the network in response to a command on a job control sheet if located in the predetermined area, the address being defined in the machine readable indicia, wherein a return address can be defined in machine readable code on the second edge of the job control sheet and used by the recipient to reply by rotating the job control sheet 180 degrees and using it with a like multi-function printer device.

* * * * *